United States Patent [19]

De Schamphelaere et al.

[11] Patent Number: 4,575,739

[45] Date of Patent: Mar. 11, 1986

[54] RECORDING APPARATUS

[75] Inventors: Lucien A. De Schamphelaere, Edegem; Freddy M. Librecht, Boechout; Willy F. Van Peteghem, Berchem; Etienne M. De Cock, Edegem, all of Belgium

[73] Assignee: AGFA-Gevaert, N.V., Mortsel, Belgium

[21] Appl. No.: 665,521

[22] Filed: Oct. 26, 1984

[30] Foreign Application Priority Data

Nov. 1, 1983 [EP] European Pat. Off. ........ 83201561.4

[51] Int. Cl.$^4$ .............................................. B41B 13/00
[52] U.S. Cl. ...................................... 346/160; 346/154
[58] Field of Search ................. 346/160, 154, 76 PH, 346/76 L, 108, 107 R; 400/119, 121; 354/4; 358/300; 364/514; 101/DIG. 13; 360/61, 63; 219/216 PH

[56] References Cited

U.S. PATENT DOCUMENTS 4,096,486  6/1978  Pfeifer et al. .......................... 358/21
4,149,192  4/1979  Takeuchi .............................. 346/154
4,445,796  5/1984  Lisica et al. ......................... 400/121

Primary Examiner—E. A. Goldberg
Assistant Examiner—A. Evans
Attorney, Agent, or Firm—A. W. Breiner

[57] ABSTRACT

A recording apparatus for linewise recording information on a moving photoreceptor, comprising a recording head with two staggered rows of pointlike radiation sources, wherein a shortcoming of prior art devices, namely stepwise deformation of a recorded line, caused by an incorrect registering of the even and uneven data dots, as a consequence of speed fluctuations of the photoreceptor upon recording, is overcome by controlling the recording of the data signals as a function of a signal from a speed sensor of the photoreceptor.

5 Claims, 8 Drawing Figures

RECORDING APPARATUS

BACKGROUND OF THE INVENTION

The present invention relates to a recording apparatus for linewise recording information upon a moving photoreceptor.

Apparatus for recording information upon a moving photoreceptor are known comprising a multiplicity of stationary pointlike radiation sources that are distributed along a recording head extending transversely of the direction of displacement of a photoreceptor, and that are individually energizable for information-wise exposing the photoreceptor in response to received information signals as the photoreceptor moves past the recording head.

The transfer of the images of the radiation sources onto the photoreceptor can be achieved by means of lens arrangements, fiber optics or fiber pipes, self focussing fibers, or the like.

It is usual for the recording head to comprise two parallel staggered rows of the radiation sources. In comparison with the use of a single row of radiation sources the spacing between adjacent sources of a row can in those circumstances be doubled while achieving the same image resolution.

It is considered in the art that at least 10 irradiated points per mm are required on the photoreceptor, so that for recording an information line across a standard DIN A4 photoreceptor, which has a width of 216 mm, a recording head comprising at least about 2200 discrete radiation sources is required. A plurality of light sources in the form of LED's (light-emitting diodes) can be formed as an array on a monolithic semi-conductor chip. By line-wise assembling a plurality of chips, a recording head having a length of 216 mm can be obtained.

When using radiation sources disposed in two rows, the illumination of the sources forming the more downstream row, reckoning in the direction of motion of the photoreceptor must be delayed relative to the illumination of the sources of the other row in order that the projected images of the different rows of sources shall be on a common transverse line across the photoreceptor.

Apparatus wherein such a delay occurs are disclosed e.g. in GB Appl. 2,042,746 A of Savin Corporation, relating to a multiple variable light source photographic printer, and in European Appl. 82 201 324.9 of Agfa-Gevaert N.V., relating to a recording apparatus.

In order to obtain very satisfactory results from the mentioned delay technique above referred to, it is necessary for the speed of advance of the photoreceptor to be kept rigorously constant. In the absence of a constant speed, the points irradiated by the different rows of light sources will not coincide on the same line of the photoreceptor, so that after development a "stepped" line form is obtained. The mentioned image defect is usually small, and is acceptable in recording apparatus for the production of office copies and the like. The defect is, however, not acceptable in recording apparatus for the production of high quality line prints, e.g. prints produced in digital medical diagnostic systems.

It is possible to provide to synchronise the operation of the electronic recording means with drive mechanism for the photoreceptor, by electronically coupling the drive to the synchronization impulses of the recording signal. But this requires a complicated driving system which may notably affect the cost-price of the apparatus.

SUMMARY OF THE INVENTION

It is the aim of the present invention to provide a recording apparatus, wherein accurate alignment of the projected images of different rows of radiation sources is achieved in a more convenient and economic manner.

Recording apparatus according to the present invention is of a kind known per se, comprising a recording head with a multiplicity of individually addressable and energisable point-like radiation sources arranged in staggered parallel rows for irradiating points across a photoreceptor during movement thereof relative to and in a direction normal to said rows, and driver circuits for simultaneously energising the radiation sources of each row responsive to respective data bit input signals serially applied to said driver circuits during an information line period, there being delay means for delaying energisation of the radiation sources of a first said row relative to the energisation of the sources of a second said row thereby to compensate for the distance between such rows. The apparatus according to the invention is distinguished from the known apparatus of that kind by the following combination of characterising features:

- the said driver circuits are provided with means which restricts the individual line exposure times for which the radiation sources of each row are energised, to a value less than one line period;
- the apparatus includes speed monitor means for monitoring the speed of a said photoreceptor and yielding output signals indicative of photoreceptor speed variations;
- there is trigger means effective for initiating the energisation period of each of said rows of radiation sources, by the respective received energising signals, at a moment subsequent to the commencement of one line period; and
- said trigger means is responsive to said output signals from said speed monitor means so that the moment of initiation of the energisation period of said first row of radiation sources by data bit signals pertaining to an information line is automatically determined in dependence on any change in the photoreceptor speed subsequent to the energisation of said second row of radiation sources by data bit signals pertaining to that same information line, thereby to achieve transverse alignment of the projected information line points on the photoreceptor.

The term "line period" stands in the present specification for the period of time which equals $(1/n)s$, wherein $n$ is the number of lines recorded per second.

It is to be understood that the recording head of an apparatus according to the invention may include more than two staggered rows of said point-like radiation sources. In such a case there will be delay means for delaying energisation of the radiation sources of said second row relative to those of the third row, and so on if there are more than three rows. And there will be trigger means responsive to signals from the photoreceptor speed monitoring means for triggering the commencement of the energisation period of the radiation sources of the third and any subsequent row to ensure transverse alignment of all of the corresponding projected information line points on the photoreceptor.

For convenience reference is made hereafter only to two rows of radiation sources. In general the use of only two rows of radiation sources suffices, and is preferred.

The radiation sources are preferably LED's.

In the apparatus according to the invention, there occurs a continual checking and if necessary correction of the moment of exposure of the photoreceptor responsive to the delayed line-part signals to ensure alignment of the corresponding formed image points with those irradiated responsive to the signals representing the other part of the information line. The results are therefore to a large extent unaffected by small imperfections in the driving system of the photoreceptor. In consequence the drive mechanism for the photoreceptor can comprise a conventional asynchronous A.C. motor, instead of a synchronous motor, or a voltage-controlled D.C. motor.

In preferred embodiments of the invention means is provided whereby the periods for which the radiation sources of the said first and second rows are energised can be varied for varying the optical density of the information record on a said photoreceptor.

It is also very advantageous for the moment of initiation of each energisation period of said second row of radiation sources also to be triggered in dependence on photoreceptor speed signals so that any immediate preceding fluctuation in speed of the photoreceptor does not prevent maintenance of a required predetermined record line spacing on the photoreceptor. In preferred apparatus according to the invention, trigger means which is responsive to output signals from photoreceptor speed monitor means is provided to ensure that each energisation of said second row of radiation sources is appropriately timed for that purpose. That trigger means and the trigger means which functions to initiate each energisation period of the first row of radiation sources can be integral parts of a single device and signals for actuating such device can be derived from one and the same photoreceptor speed monitor.

A particular apparatus according to the invention, selected by way of example, will now be described with reference to the accompanying drawings, wherein:

DESCRIPTION OF THE PREFERRED EMBODIMENT

Figure 1:
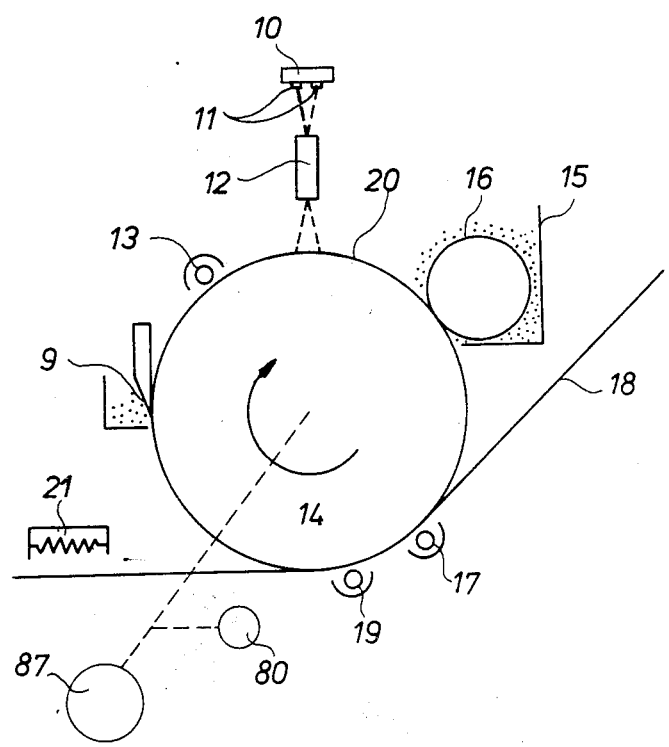
FIG. 1 is a diagrammatic view of a printing machine incorporating the apparatus.

The printing machine as shown in FIG. 1 comprises an exposure head 10 that is provided with a multiplicity of energizable pointlike radiation emitters such as 11, optical transfer means 12 for transferring the images of the emitters, and a photoreceptor in the form of a cylindrical surface of a drum 20. Known materials for the photoreceptor are doped selenium, polyvinyl carbazole, CdS, CdSe, SeTe, etc.

The operation of the machine may be as follows. A corona discharge station 13 electrically charges the surface of the drum 20, the sense of rotation of the drum being indicated by the arrow 14, and the drum being driven by a motor. The areas of the drum surface that become exposed by the emitters become discharged whereas the other, unexposed areas maintain their charge. The electrostatic charge pattern thus produced is developed by a developing station 15 wherein a developer composition 16 is brought into contact with the charge pattern on the drum.

A corona transfer station 17 transfers the toner pattern from the drum surface onto a paper sheet 18 that is moved in contact with the drum. A corona separator station 19 is effective to separate the paper sheet from the drum. A fuser station 21 fuses the toner pattern on the sheet so that a permanent copy is obtained. A cleaner station 9 is operative to remove the toner still remaining on the drum surface therefrom before a next exposure is made.

It will be understood that the photoreceptor could take some other form, e.g. the form of a belt for transferring the charge image to a suitable support, or a photosensitive sheet on which the final image is formed and fixed. Such a photosensitive sheet may e.g. comprise a support coated with a light-sensitive layer such as ZnO, silver halide, etc.

Figure 2:
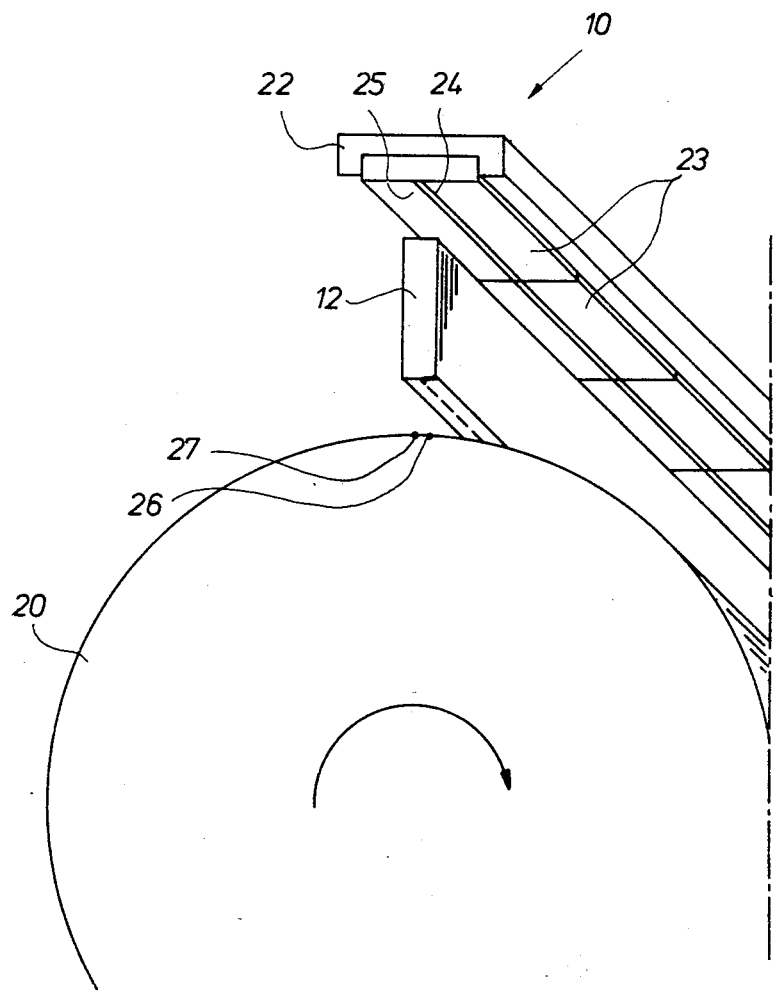
FIG. 2 is a diagrammatic isometric view of the recording head and the optical transfer means of the recording apparatus.

An isometric view of part of the exposure head 10 and the optical transfer means 12 is shown in FIG. 2. The exposure head comprises an elongate channel section bar 22 wherein a plurality of exposure modules 23 are mounted next to each other. Each module comprises several arrays of emitters as will be explained further. The emitters of all the modules are arranged in two parallel rows 24 and 25, that run parallel with the axis of the drum 20.

The optical transfer means 12 is an elongate element wherein a plurality of self-focussing fibers are provided, the optical axis of the transfer means, or more correctly the optical plane thereof, passing through the axis of the drum.

Due to the focussing power of the element 12, each of the rows of emitters will be imaged on a respective transverse line on the photoreceptor path, namely row 24 on line 26, and row 25 on line 27, the two lines being represented by dots in the figure.

Figure 3:
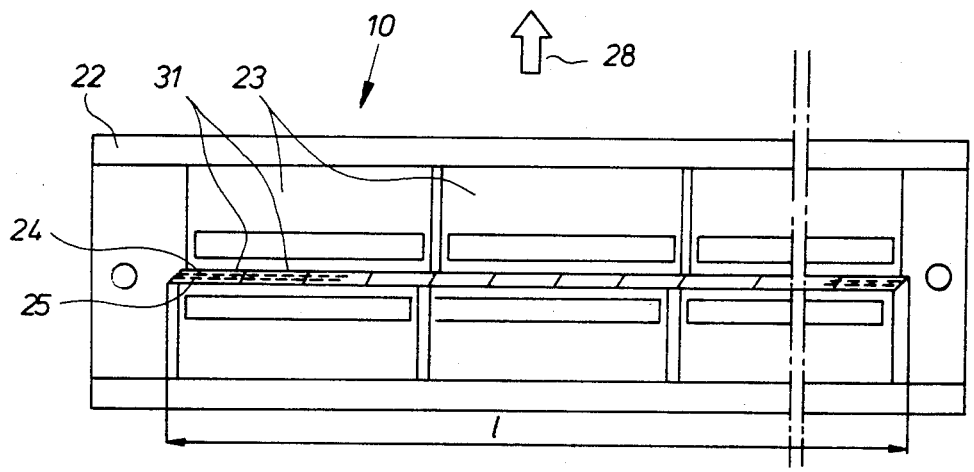
FIG. 3 is a diagrammatic plan view of the recording head.

A view of the exposure head 10, from the optical transfer means towards the head, is represented in FIG. 3. A plurality of modules 23 are mounted next to each other in the bar 22 so that the total exposure length l corresponds with the desired width of the image on the photoreceptor. The direction of movement of the photoreceptor past the exposure head is indicated by the arrow 28. The modules 23 are suitably secured in the bar by means of an electrically conductive quickly curing epoxy adhesive. The mounting of the exposure head in the apparatus may be arranged in such a way that slight adjustments of the positioning of the head are possible, thereby to ensure a true parallel alignment of the emitter rows 24 and 25 with the photoreceptor surface.

Figure 4:
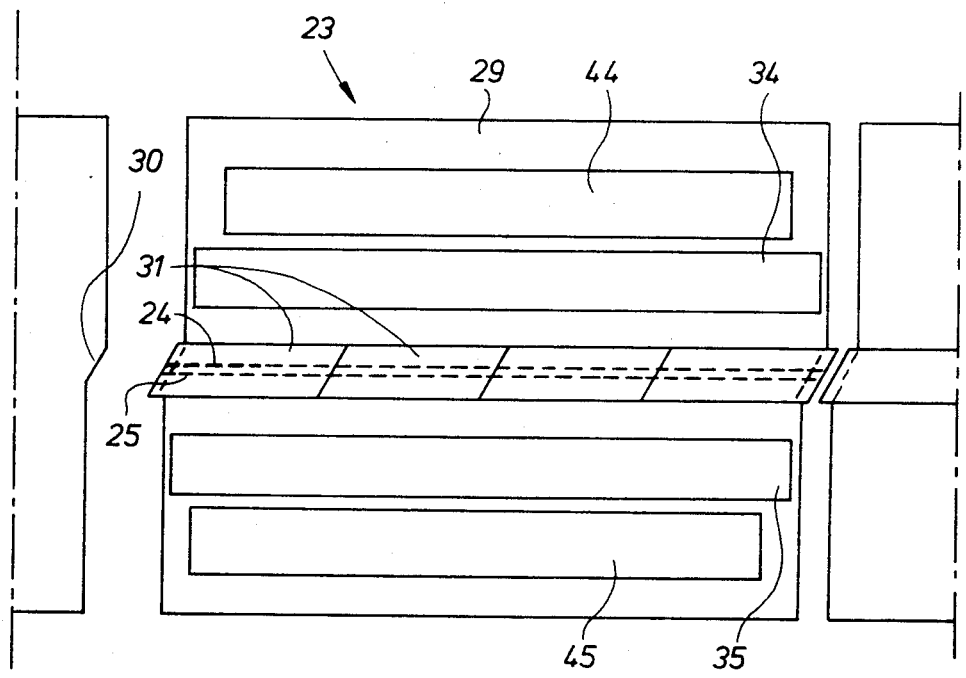
FIG. 4 illustrates diagrammatically one module of the recording head.

An enlarged view of one module 23 of the exposure head is illustrated in FIG. 4. The module 23 comprises a metal base plate 29 onto which four different arrays 31 of emitters are mounted in abutting relationship. Each array has two rows 24 and 25 of emitters. Since in the further description, light emitting diodes will be considered for the emitters, the term LED's will hereinafter be used for these elements. The LED's are made on monocrystalline chips. The LED rows are staggered. The chips may as shown be cut with oblique end edges so that when chips are mounted in mutually abutting relationship as illustrated their LED's form two uninterrupted rows notwithstanding the close spacing between neighboring LEDs of each row (see European Patent Application No. 82 201 324.9 filed the Oct. 25, 1982). The modules are in their turn mounted close to each other in the bar 22 so that the slanting end edges of their end LED chips abut each other. In this way two uninterrupted rows of equally spaced LED's are obtained over the complete length of the recording head. The electrical connections to the base chip material of each LED, in the present example the cathodes of the LED's, are achieved via the bar 22 (FIG. 3).

The control means for the LED's of each module are in the form of two integrated circuits 34 and 35, the circuit 34 controlling the even LED's, i.e. the LED's of row 24, and the circuit 35 controlling the odd LED's, i.e. those of row 25. The integrated circuits 34 and 35 are in the form of chips that likewise may be adhered to the base plate 29. Each of the chips forming the control means has a length that covers the combined LED arrays of one module. Each module includes a thick film structure 44 and 45 for performing the electrical connection of the circuits 34 and 35 into the apparatus.

It will be understood that the mounting of the LED chips and the control chips on the base plates to form the modules, and the mounting of the modules on the bar to produce the recording head, are carried out under a microscope in view of the minute dimensions of the components. A microscope is also needed for making the electrical connections between the control circuits and the LED's. The connection between each LED and a corresponding output bonding pad of the control chip can be formed by a fine wire of aluminium that is applied by the wedge-wedge technique known in the art.

Figure 5:
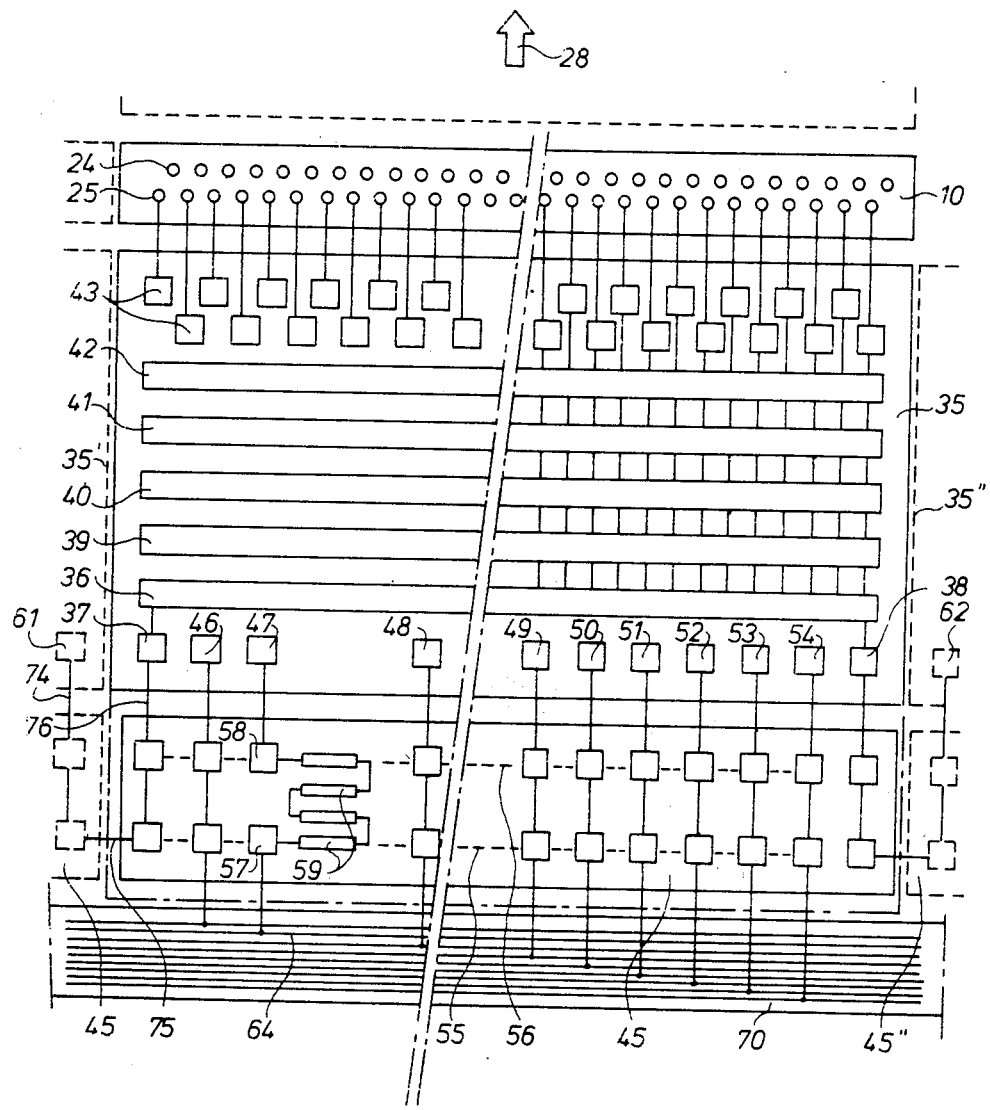
FIG. 5 illustrates diagrammatically the electronic circuitry of one half of one module of the recording head.

FIG. 5 illustrates in detail the electronic circuitry of one half of a module of the recording head.

Control chip 35 (control chips 34 being identical to chips 35) comprises a 64-steps serial-in/parallel-out shift register 36 with data bit input terminals 37 and 38, two delay registers 39 and 40, a latch register 41, sixty four individual drivers (one for each LED in the associated LED row 25), represented by one rectangular block 42, and sixty four output bonding pads 43 for the LED's in said row 25. The bonding pads are arranged in two staggered rows thereby to provide for more spacing between them.

The control chips 35 comprises the following input bonding pads: The pads 37 and 38 forming the shift register input terminals referred to above, the pad 46 that receives the trigger signal for the control of the operation of the drivers 42, the pad 47 that receives a current-level control signal, the pad 48 for the clock signal that controls the serial signal shifting through the register 36, the pad 49 for the supply voltage of the drivers 42 and the LED's, the pad 50 for the supply voltage of the registers, the pads 51 and 52 for control voltages controlling the direction of signal shift through the shift register 36 and controlling the operation of the delay registers 39 and 40, the pad 53 that is for ground connection, and finally the pad 54 that is for a load control that controls the transfer of data bits from one register to the other.

Thick film connection structure 45 (the structure 44 is identical to 45), is made on a ceramic support that may be fixed to the module 29 by adhesive bonding.

The connection structure comprises a row 55 of input bonding pads and row 56 of output bonding pads, the lateral position of which corresponds with the position of the input bonding pads of the chip 35. The corresponding input and output bonding pads of the structure 45 are in direct connection with each other, except for the pads 57 and 58 which are connected to each other through four series resistors 59.

The input bonding pads 55 are connected to a printed circuit strip 70 that extends over the complete length of the recording head and that has nine conductor paths that provide the required supply voltages and control signals for the corresponding lower half of all the modules. A similar conductor strip 60 (FIG. 6), is provided at the other side of the recording head for the connections of the control means of the upper halves of the module (see FIG. 6).

More details about the chip 35 and its operation are as follows. For the ease of explanation, it is assumed hereinafter that signal shifting in the shift register 36 of the control chip 35, and in all other control chips 35', 35" etc. at the same side of the LED chips in FIG. 5, occurs from to the left to the right.

Bonding pad 37 forms the data-bit input terminal of the chip 35, and is connected to bonding pad 61, that constitutes the output shift register terminal of the foregoing chip 35'. The bonding occurs via the thick film structures 45' and 45, and the wire connections 74, 75 and 76. Signals received at 37 are stepwise shifted through the shift register 36 under the control of a clock signal applied at input 48. Once the register has stepped a number of times, e.g. sixty four times in the present example, the next stepping causes the first received signal to leave the register at output pad 38 and to enter the register of the next chip 35" at input pad 62. This next chip 35" is in connection with the chip 35"' next to it, etc.

The direction of signal shift through the register 36 depends on the selection of the input pad 51 or 52 for the reception of a D.C. setting voltage. The chip 35 is in fact connected into the operating circuitry of the recording head so that a D.C. voltage is applied at pad 52. Because of the internal design of the chip, the application of this D.C. voltage to pad 52 sets the chip for effecting the signal shift from left to right in response to the clock signal at 48 and at the same time renders the delay registers 39 and 40 inoperative.

The bonding pad 54 receives the "load" signals for instructing processing of the data signals in the shift register 36. A load signal, or in orther words a "line" signal, causes the parallel transfer of all the data bits from register 36 towards the LED drivers 42. Because the delay registers 39 and 40 of chip 35 are rendered inoperative by its setting, the data bits received by the shift register 36 of chips 35 are transferred from that shift register directly to the latch register 41 on their chips. The drivers 42 for the odd LED's forming row 25 are directly connected to that latch register. However although the drivers 42 receive the relevant data bit signals from the latch register 41 during each line period in response to the "load" signal, those signals cannot be released to their respective LEDs until the drivers are activated by a "trigger" signal. This trigger signal, which activates all of the drivers 42 for the odd LEDs, is delivered at a moment which is determined by output signals from a photoreceptor speed monitor as will hereafter be described with reference to FIGS. 5 to 8. The moment at which the drivers 42 are thus triggered is such as to preserve a predetermined uniform record line spacing on the photoreceptor.

As already indicated, the chip 34, which in the aspect of FIGS. 4 and 5, is located above the LED arrays 31, is identical with chip 35. However, because chip 34 is inverted end for end relative to chips 35 and the data-bit input signals are supplied to both chips from the same end of the recording head (from the left in the aspect of FIGS. 4 and 5) it follows that in the case of chip 34, its bonding pad 38 serves as its data-bit input terminal and its bonding pad 37 serves as its data-bit output terminal. Therefore the chip 34 is connected into the operating circuitry so that the D.C. setting voltage is applied to its pad 51, thereby setting the chip so that the signal shift through its shift register 36 also takes place from left to right in the aspect of FIGS. 4 and 5 notwithstanding that the chip is inverted end for end relative to chip 35. The application of the setting voltage to the pad 51 of chip 34 renders its delay registers 39 and 40 operative. Consequently, the data-bit signals received by the shift register of chip 34 are not transferred directly from that register to the latch register 41 of that chip but are transferred step-wise, firstly to its delay register 39, then from that delay register to delay register 40 and then from that delay register to the latch register. Each of the transfer steps takes place responsive to a load signal on the bonding pad 54 above referred to. Each such load signal causes transfer of data bit signals from the shift register of chip 34 to its first delay register 39 simultaneously with the transfer of previously received data-bit signals from that delay register to the second delay register 40 and with the transfer of still earlier received data-bit signals from that second delay register to the latch register of the chip. And signals transferred to that latch register can drive the connected even LEDs responsive to those signals immediately those drivers are triggered by a trigger signal transmitted responsive to photoreceptor speed fluctuation as hereinafter referred to.

The result of the operation of the delay registers in the chip 34 is therefore that the energisation of the even LEDs forming row 24 in accordance with data-bit signals pertaining to any given information line is delayed until two line periods later than the energisation of the odd LEDs responsive to the data-bit signals pertaining to the same information line. This two-line delay compensates for the distance between the two rows of LEDs, of course after taking into account the mean speed of the photoreceptor. The precise time interval between the two energisations effecting recording of parts of any given information line is also dependent on readings of photoreceptor speed variations (if any) between the two energisations as hereafter referred to. The precise time interval is such as to ensure transverse alignment of the projected LED images on the photoreceptor.

Finally, there is the input pad 47 onto which a current-level control signal is applied. This signal determines the mean current that is produced by a driver into its corresponding LED. Reference to the "mean" current is made because owing to fabrication tolerances of drivers and LED's, the actual current through a LED may be up to e.g. 10% larger or smaller than the desired nominal value. Setting of the control signal occurs by the short-circuiting of one or more of the four different series resistors 59. The resistor array enables fifteen different combinations to be made. The resultant control current signal is the quotient of the DC voltage, e.g. 5 V, on line 64 and the total series resistance. The actual current through the LED's is a number of times larger than the corresponding control current as a consequence of an amplification by a fixed factor set in the electronic circuitry of the chip 35. For instance, a control current of 500 μA, may produce a mean LED current of 3 mA.

The described technique of performing the connections of the control means of each module through an intermediary connection circuit, namely the thick film structures 45, has the advantage that if any replacement of a defective module by a good one is required at any time this can be done while leaving the fine wire connections to the other modules intact.

The fact that the chips 34 and 35 controlling the different rows of LEDs are identical affords the important advantage of standardised manufacture. This more than compensates for the inclusion of delay registers even on chips which are used in such a way that those delay registers are superfluous. The employment of identical control chips with a selectable signal shift direction facility for different rows of radiation sources involves use of the invention described in EU-Application No. 83 201 562.2 filed on the Nov. 1, 1983, and entitled: "Recording Apparatus".

Figure 6:
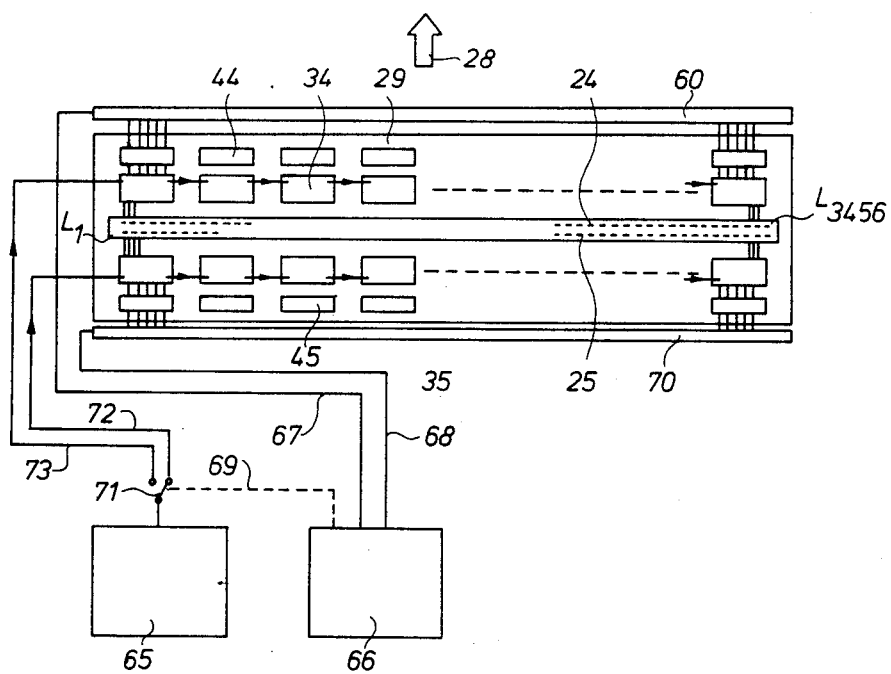
FIG. 6 is an electronic block circuit of the recording apparatus.

The electronic block circuit of the apparatus is illustrated in FIG. 6, wherein 65 is a character generator, and 66 is a control unit wherein a clock signal is produced as well as supply voltages and trigger and load signals that are fed via several conductors represented in simplified form by the lines 67 and 68 to the printed circuit strips 60 and 70 via which they are fed to the corresponding control chips 34 and 35 of the modules. The clock signal controls via a line 69 a semi-conductor switch 71 that alternately applies via the lines 72 and 73 the data signals to the row 25 of odd and the row 24 of the even numbered LED's. In the recording head of the present example there are provided 3456 LED's, arranged in two staggered rows each of 1728 LED's.

It will be understood that in practice the apparatus will comprise many other circuits for the control of the different operations, such as setting and resetting circuits, synchronization circuits, stabilizing circuits, defect signalling circuits, etc. Such circuits are known in the art, and a description of them is not required for the understanding of the operation of the apparatus.

Figure 7:
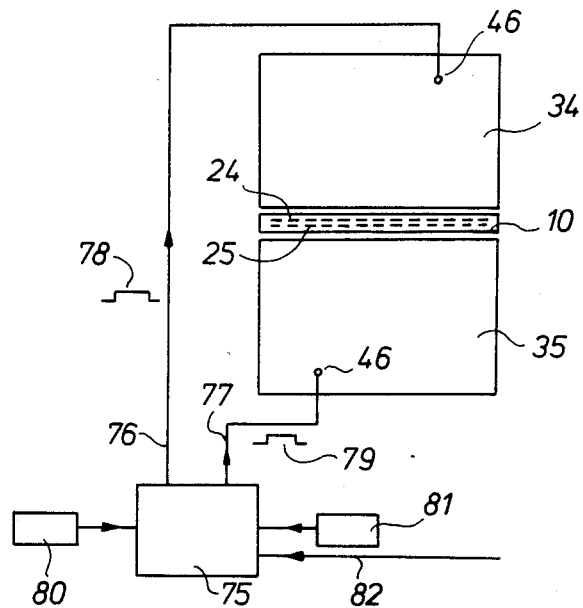
FIG. 7 is a block circuit of the trigger means.
Figure 8:
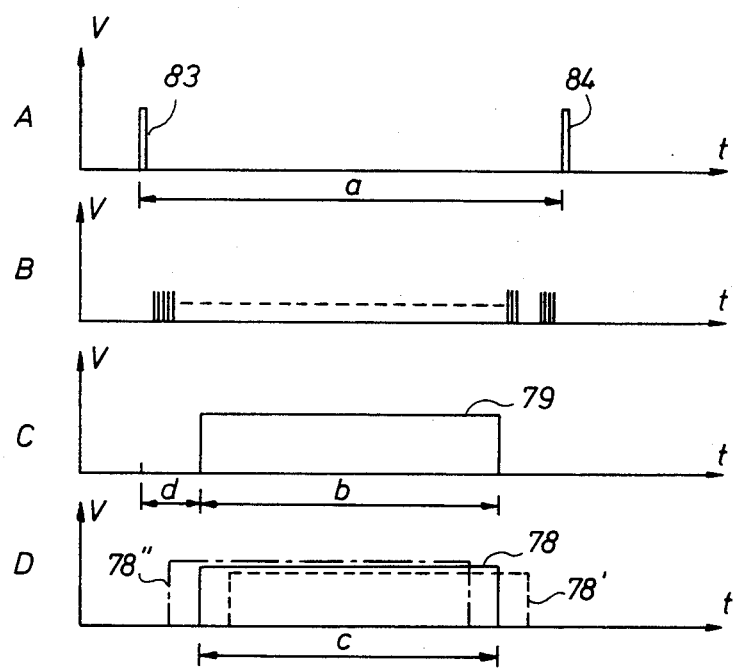
FIG. 8 comprises time diagrams of different control signals.

Referring to FIG. 7, the trigger control 75 is a circuit that produces on output lines 76 and 77 output impulses 78 and 79 in response to the input signals from a speed sensor 80 sensing the actual speed of the photoreceptor by measuring the speed of the drum 20 driven by a motor 87, from an optical density setter 81, and from the load impulse on line 82.

The speed sensor may be any type of optical, inductive or other sensor that offers a high sensitivity and has a rapid response. One example of a suitable sensor is an optical encoder which comprises a disc with e.g. 5000 pulses distributed along its periphery.

FIGS. 8A to 8D respresent in terms of voltage and time the different electrical signals that are involved in the trigger control. The t axes of the different diagrams represent successive line periods and the diagrams are drawn in register so that corresponding moments from the starts of such periods are in vertical register.

FIG. 8A illustrates two successive load impulses 83,84, as they are applied on inputs 54 of the control means. The distance a between the impulses corresponds with a single line period, which in the specific example hereinafter given is 625 μs.

FIG. 8B illustrates diagrammatically a plurality of data bits as they applied to the shift registers during one said period.

FIG. 8C illustrates a trigger impulse 79 that is used to trigger the drivers of the odd LED's forming row 25, such drivers being on the control chips 35. The length b of said impulse is shorter than the length a of a line period and the optical density level of the developed image. This density level is set according to the desired density level of the developed image. The setting is effected by the optical density setter 81 (FIG. 1). The shorter the duration of the pulse the narrower will be the line of image points on the photoreceptor and the smaller will be the apparent overall density of the eventual developed print. In a specific example, b is 400 μs.

FIG. 8D illustrates a trigger impulse 78 that is used to trigger the drivers of the control chips 34 for energising the even LEDs, forming row 24. The length c of impulse 18 is equal to the length b of impulse 79.

It will be seen that impulse 79, which causes the drivers 43 on chips 35 to energise the odd LEDs forming row 25 in accordance with data bit signals from the shift register 36 commences at the end of a time interval d from the commencement of a line period. The impulse 79 is initiated by a "load" impulse transmitted to the trigger control circuit 75 via line 82. The time interval d is, in a specific example, 0.010 μs.

Assuming a perfectly constant predetermined photoreceptor speed over the period from the energisation of the said odd LEDs by data-bit signals pertaining to a given information line, the remainder of the data-bit signals pertaining to that same information line should cause energisation of the even LEDs during the next but one line period at the end of an identical time interval d from the commencement of that line period. The pulse 79 should in those circumstances occupy the position shown in full line in FIG. 8D. If such a perfectly constant predetermined photoreceptor speed could be ensured, correct transverse alignment of the projected images of two LED rows on the photoreceptor could be achieved by triggering the energisation of not only the odd LEDs but also the even LEDs at the end of a constant time interval d from the commencement of each line period. However, the said average speed will in practice be liable to fluctuate unless a very sophisticated and expensive photoreceptor drive mechanism is employed. Therefore, in accordance with the invention, the moment of initiation of the signal pulse 78 is automatically variable in dependence on signals deriving from the photoreceptor speed sensor 80 (FIG. 7). Depending on such signals, which are indicative of average photoreceptor speed change over each double line period following an energisation of the odd LEDs, the moment of initiation of the pulse 78 is advanced or retarded. The broken lines 78' and 78" in FIG. 8D represent an advanced and retarded position of the pulse respectively. The maximum possible extents of advance and retardation are of course limited by the necessity for the pulse 78, like the pulse 79, to occur within the line period a. By this automatic initiation of pulse 78 in dependence on photoreceptor speed changes, alignment of the projected images of the odd and even rows of LEDs on the photoreceptor is achieved irrespective of photoreceptor speed fluctuations so that the developed information lines will be free of stepped deformations.

The generator 65 (FIG. 6) produces data-bit signals for the recording of the first image line to be recorded on the photoreceptor. Switch 71 is controlled by the clock frequency, e.g. a frequency of the order of magnitude of 3 Mhz, such that the signal for the first image point of the first image line is put on line 72, the signal for the second image point is put on line 73, the next signal on line 72, the still next on line 73, etc., until finally 1728 distinct (odd) image points have been read-in in the shift registers 36 of the control chips 35, and 1728 image (even) image points have been read-in in the shift registers 36 of the control chips 34. The total number of 3456 image points is determined by the use of the recording head of 27 modules with 128 LED's each.

Appropriate low impulse signals are transmitted by control unit 66 via lines 67 and 68 to the input pads 54 of the control chips 34 and 35 so that the chips 35 are caused to pass their data signals in parallel directly from their shift registers 36 to their latch registers 41, so that these signals become applied to the corresponding odd LED's in response to the pulse 79; and the control chips 34 are caused to pass their data signals in parallel from their shift registers 36 to their first delay registers 39.

After the photoreceptor has been advanced over a distance corresponding with the thickness of one recording line (the raster line pitch), the latch registers 41 are reset by an appropriate signal, and data signals representing of chips 35 the second image line to be recorded are produced by the generator 65.

These second line signals are now read-in to the control chips 34 and 35 in the same way as the first line signals. Now another load signal is transmitted to input pads 54. The data-bit signals in shift registers 36 of the control chips 35 are transferred directly to their latch registers 41 and cause energisation of the odd LEDs immediately their drivers are triggered by the next pulse 79. The load signal applied to the input pads 54 associated with the control chips 34 however cause the second line data-bit signals stored in the shift registers 36 of those chips to be transferred to the delay registers 39, and the signals previously stored in those registers to be transferred to the neighbouring delay registers 40. The third line data-bit image signals are then fed into the control chips by the generator 65. On production of the next load signal on the input pads 54 the odd information signals are directly recorded as for the previous lines, whereas the even signals stored in each of the registers of control chips 34 are advanced one step: the signals stored in their shift registers are transferred to their delay register 39; the signals previously stored in those registers are transferred to their delay registers 40, and the signals previously stored in those registers are transferred to their latch registers 41 and become recorded immediately the drivers of the even LEDs are triggered by the next pulse 78. The recording of the even image points belonging to a given information line is therefore delayed by two line periods (plus or minus the automatic adjustment for photoreceptor speed fluctuation) relative to the recording of the odd image points belonging to that line. This delay compensates for the distance between the two rows of LED's, which is twice the distance between successive raster lines on the photoreceptor.

The recording of the fourth and subsequent information lines is effected by continuing the same sequence of steps.

The following data pertain to a particular embodiment of the invention as above described with reference to the drawings.

Recording head:
  net recording length 1: 216 mm
  number of LED's per row: 1728
  number of LED's per mm recording length: 16
  number of modules: 27
  row spacing = 125 µm
  staggering: 62.5 µm
  shift registers 36, delay registers 39,40, and latch registers 41: 64 bits
  line period a: 625 µs
  pulse duration b (=LED energisation period): between 0 and 99% of line period.
  clock frequency: 3 Mhz
  resistors 59: 4, 2, 1 and 0,5 Kohms arranged for trimming
  optical transfer means 12: a Selfoc, type SLA 20, manufactured by Nippon sheet glass Co., Ltd.
  motor driving the photoreceptor: asynchronous A.C. motor, 75 Watts.
  recording speed: 10 cm.s$^{-1}$.

The present invention is not limited to the above described embodiment.

The control chips 34 and 35 need not necessarily be identical. For instance, the control chips 35 may be replaced by chips which differ from the chips 34 in that they are without delay registers. However, as previously stated, this would not necessarily mean a cost saving for the apparatus.

The recording head of the apparatus may comprise more than two staggered rows of sources of radiation, each row other than the first row being associated with its own particular delay, and trigger control.

The modules may comprise one large array of LED's, instead of four smaller arrays as described. The modules may also comprise parallel rows of chips each having a single rows of LED's, the chips of the different rows being in staggered relation as disclosed in the EU-application 82 201 324.9 relating to a recording apparatus for linewise recording information upon a moving photoreceptor.

We claim:

1. A recording appratus for linewise recording information on a moving photoreceptor, said apparatus comprising a recording head with a multiplicity of individually addressable and energisable point-like radiation sources arranged in staggered parallel rows for irradiating points across a photoreceptor during movement thereof relative to and in a direction normal to said rows, and driver circuits for simultaneously energising the radiation sources of each row responsive to respective data bit input signals serially applied to said driver circuits during an information line period, there being delay means for delaying energisation of the radiation sources of a first said row relative to the energisation of the sources of a second said row thereby to compensate for the distance between such rows, characterised in that the said driver circuits are provided with means which restricts the individual line exposure times for which the radiation sources of each row are energised, to a value less than one line period;

the apparatus includes speed monitor means for monitoring the speed of a said photoreceptor and yielding output signals indicative of photoreceptor speed variations;

there is trigger means effective for initiating the energisation period of each of said rows of radiation sources, by the respective received energising signals, at a moment subsequent to the commencement of one line period; and said trigger means is responsive to said output signals from said speed monitor means so that the moment of initiation of the energisation period of said first row of radiation sources by data bit signals pertaining to an information line is automatically determined in dependence on any change in the photoreceptor speed subsequent to the energisation of said second row of radiation sources by their data bit signals pertaining to that same information line, thereby to achieve transverse alignment of the projected information line points on the photoreceptor.

2. A recording apparatus according to claim 1, having means whereby the periods for which the radiation sources of said first and second rows are energised can be varied for varying the optical density of the information record on a said photoreceptor.

3. A recording apparatus according to claim 1, wherein trigger means is operative in response to output signals from photoreceptor speed monitor means to initiate each energisation period of said second row of radiation sources at a moment such as to preserve a predetermined record line spacing on the photoreceptor despite any photoreceptor speed change subsequent to the preceding energisation of said second row of radiation sources.

4. A recording apparatus according claim 1, wherein the radiation sources of said recording head are all arranged in said staggered first and second rows.

5. A recording apparatus according to claim 1, wherein said radiation sources are LEDs.

* * * * *